(12) United States Patent  (10) Patent No.: US 8,825,505 B1
Alava  (45) Date of Patent: Sep. 2, 2014

(54) SYSTEMS AND METHODS FOR REVERSE AUTOMOBILE QUOTE

(75) Inventor: Galo Alava, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 760 days.

(21) Appl. No.: 12/437,613

(22) Filed: May 8, 2009

(51) Int. Cl.
G06Q 40/00 (2012.01)

(52) U.S. Cl.
CPC ..................................... G06Q 40/00 (2013.01)
USPC ............................................................ 705/4

(58) Field of Classification Search
USPC ............................................................ 705/4
See application file for complete search history.

(56) References Cited

U.S. PATENT DOCUMENTS

| 7,389,246 | B1* | 6/2008 | Ohrt ................................. | 705/4 |
|---|---|---|---|---|
| 7,774,217 | B1* | 8/2010 | Yager et al. ...................... | 705/4 |
| 8,219,427 | B1* | 7/2012 | Yager et al. ...................... | 705/4 |
| 2001/0049653 | A1 | 12/2001 | Sheets | |
| 2003/0236686 | A1* | 12/2003 | Matsumoto et al. .............. | 705/4 |
| 2004/0243449 | A1* | 12/2004 | Neustadt et al. .................. | 705/4 |
| 2007/0136162 | A1* | 6/2007 | Thibodeau et al. ............. | 705/35 |
| 2007/0282737 | A1* | 12/2007 | Brasch ............................ | 705/38 |
| 2008/0015890 | A1* | 1/2008 | Malyala .......................... | 705/1 |
| 2008/0319832 | A1 | 12/2008 | Liebe et al. | |
| 2010/0145828 | A1* | 6/2010 | Callow et al. .................. | 705/27 |

OTHER PUBLICATIONS

Go Insurance, "Minimum Level of Auto Insurance Coverage Per State" Feb. 17, 2009.*
Morgahn, John Comptroller "An Analysis of Tennessee's Motor Vehicle Liability Insurance Limits" Dec. 2006.*
"Shopping for Auto Insurance what Should you be Looking for?", Auto Insurance Articles and Car Insurance RSS Feeds, 2007, pp. 1-4.

* cited by examiner

Primary Examiner — Neal Sereboff
(74) Attorney, Agent, or Firm — Baker & Hostetler LLP

(57) ABSTRACT

A system, method, and computer-usable medium are disclosed for determining a maximum amount to finance based on a plurality of periodic payments. The maximum financed amount of the purchase price of a vehicle is determined based on a plurality of periodic payments, including the cost of vehicle insurance coverage. Data associated with a borrower is retrieved, followed by the borrower providing information related to a target vehicle and a maximum periodic payment amount for the cost of financing the target vehicle and insuring it. Vehicle insurance requirement data, vehicle insurance policy data, and vehicle loan terms data is then provided and processed with the vehicle data and the borrower data to generate a periodic cost for a vehicle insurance policy. Thereafter, the vehicle data, vehicle loan terms data, and borrower data are processed to generate a periodic cost for a loan on the vehicle. In turn, the periodic cost for the vehicle insurance policy, the periodic cost for a loan on the vehicle, and the total periodic payment amount provided by the borrower are processed to generate a maximum amount of the purchase price of the vehicle to finance.

10 Claims, 6 Drawing Sheets

Web Browser

File  Edit  View  Favorites  Tools  Help

⇦Back | ▶ | ⊗ | ⇧ | 🏠 | Favorites | ⓘ Help |

Address  Http://www.PurchasePriceAssistance.com — 402

- Borrower's Name  [Charles Adams]  — 404
- Residence State  [Texas]  — 406
- Borrower's SSN#  [123-45-6789]  — 408
                                        — 424
Insurance Coverage
- ☑ Minimum  — 428
- ☐ Average  — 430
- ☐ Maximum  — 432

Vehicle Insurance Advice
You have selected minimum insurance coverage for this vehicle and the monthly insurance cost displayed is for the minimum vehicle insurance coverage for the state of Texas. Since your total monthly cost is less than the maximum monthly cost you entered, we suggest that you select average coverage instead. The difference in the monthly cost will still be less than the maximum monthly cost you entered.
— 414

Vehicle Classification  [SUV]  — 410
Vehicle Manufacturer  [KIA]  — 412
Vehicle Model  [Sorento]  — 414

Year
                                    Model — 422
☑ New  [2009]
418
☐ Used  420

Maximum Monthly Cost  [$450.00]
                              — 434

[Submit Vehicle Information] — 436
                              460
[Re-submit Vehicle Information] — 438

Max. Loan
                        Amount — 444
Monthly Loan Cost  [$20,000.00]
— 440
Monthly Insurance Cost
— 442

Interest   Loan    Monthly
          Rate — 446  Term — 448  Payment — 450
          [8%]       [72 mo.]     [$350.66]
                              452
Total Monthly Cost  [$75.58]
                    [$426.24]

Web Browser

File  Edit  View  Favorites  Tools  Help

Back | Favorites | Help

Address: Http://www.PurchasePriceAssistance.com

- 404 — Borrower's Name: Charles Adams
- 406 — Residence State: Texas
- 408 — Borrower's SSN#: 123-45-6789

Insurance Coverage — 424

- 428 ☐ Minimum
- 530 ☑ Average
- 432 ☐ Maximum

410 — Vehicle Classification: SUV
412 — Vehicle Manufacturer: KIA
414 — Vehicle Model: Sorento 418 ☑ New    420 ☐ Used    Year Model: 2009 — 422 / 402

Maximum Monthly Cost: $450.00 — 434

Submit Vehicle Information — 436

444 — Max. Loan Amount: $20,000.00    446 — Interest Rate: 8%    448 — Loan Term: 72 mo.    450 — Monthly Payment: $350.66

440 — Monthly Loan Cost        $98.77
542 — Monthly Insurance Cost

552 — Total Monthly Cost: $449.43

Re-submit Vehicle Information — 538 / 460

Vehicle Insurance Advice — 514

You have selected average insurance coverage for this vehicle, which surpasses the minimum vehicle insurance coverage for the state of Texas. Your total monthly cost is still less than the maximum monthly cost you entered.

— 206

SYSTEMS AND METHODS FOR REVERSE AUTOMOBILE QUOTE

BACKGROUND

1. Field of the Disclosure

Embodiments of the disclosure relate in general to the field of computers and similar technologies, and in particular to software utilized in this field. Still more particularly, it provides a system, method, and computer-usable medium for determining a maximum amount to finance based on a plurality of periodic payments.

2. Background of the Disclosure

Purchasing a vehicle can be a tedious, time consuming, and at times perplexing and frustrating experience for most consumers. Is this the car I really want? Am I getting the best possible price? Is it going to hold its value? Can I afford the payments? How much can I really afford? What if I am unable to get the financing I want? All of these, and more, are common questions that run through the mind of someone considering the purchase of a vehicle, regardless of whether it is new or used.

One approach to these issues is to go through a buyer's service or broker. You decide what kind of vehicle you are interested in and how much you are willing to spend. In turn, searching for the vehicle, negotiating its purchase price, and arranging its financing are all taken care of. Another approach gaining recent popularity is to research and shop for a vehicle online. Some Web sites even provide loan calculators to help consumers calculate the monthly payment for a vehicle. Once you find the vehicle you want, you make an offer, either through the dealer's Web site or by telephone. It is even becoming more common to arrange financing online.

However, many of these approaches are top-down. That is, the consumer selects the vehicle they want, obtains a price, and then the monthly payment is calculated. As a result, determining the maximum amount that can be financed to meet a target monthly payment often involves several trial and error attempts. Other approaches are known that are bottom-up. In these approaches, the consumer provides a maximum monthly loan amount they are willing to pay and a calculation is performed to provide an amount to borrow. However, an often overlooked aspect of purchasing a vehicle is the cost of insurance. Many states have minimum insurance coverage requirements. Likewise, it is not unusual for a financial institution to require additional insurance coverage for the financed value of the vehicle. Furthermore, it is often difficult for a consumer to predict insurance costs for a vehicle until after they have committed to purchasing the vehicle. Moreover, it is not uncommon for a consumer to be unpleasantly surprised when the combined loan payment and insurance premium cost is in excess of their original monthly budget for a vehicle. As a result, the consumer may be tempted to reduce their insurance coverage to lower their monthly costs. However, doing so often places them at more risk if they are involved in an accident.

BRIEF SUMMARY

A system, method, and computer-usable medium are disclosed for determining a maximum amount to finance based on a plurality of periodic payments. In various embodiments, the maximum financed amount of the purchase price of a vehicle is determined based on a plurality of periodic payments, including the cost of vehicle insurance coverage. In these and other embodiments, data associated with a borrower, such as their address, financial information, driving record, and associated vehicle insurance claim data is retrieved for processing. The borrower then provides information related to a target vehicle. In various embodiments, the provided vehicle information may comprise the vehicle's age, its list price or actual cost, its classification, various description data, related crash rating data, or corresponding repair cost data. The borrower then provides a maximum periodic payment amount for the cost of financing the target vehicle and insuring it.

Vehicle insurance requirement data, vehicle insurance policy data, and vehicle loan terms data is then provided for processing. In various embodiments, the vehicle insurance requirement data may comprise minimum insurance coverage requirements mandated by a state law or by a financial institution, such as a vehicle financing provider, holding a lien on a vehicle. In various embodiments, the vehicle insurance policy data may comprise vehicle insurance policy coverage, vehicle insurance policy coverage parameters, and corresponding premium amounts to the coverage parameters. In these and various other embodiments, the vehicle loan terms data may comprise the purchase amount of the vehicle, the amount of a down payment, or a financed amount. Likewise, the vehicle loan terms data may also comprise an annual percentage rate, a number of periodic payments, a periodic payment amount, or a credit rating score associated with the borrower.

The provided vehicle data, vehicle insurance requirement data, vehicle insurance policy data, and borrower data is processed to generate a periodic cost for a vehicle insurance policy. Thereafter, the provided vehicle data, vehicle loan terms data, and borrower data are processed to generate a periodic cost for a loan on the vehicle. In turn, the periodic cost for the vehicle insurance policy, the periodic cost for a loan on the vehicle, and the total periodic payment amount provided by the borrower are processed to generate a maximum amount of the purchase price of the vehicle to finance. In various embodiments, approaches known to skilled practitioners of the art are implemented to perform the processing operations. The maximum vehicle purchase amount to finance is then displayed to the borrower within a user interface (UI). If the borrower is dissatisfied with the results, the provided information is modified within the UI and resubmitted for processing.

BRIEF DESCRIPTION OF THE DRAWINGS

Selected embodiments of the disclosure may be understood, and its numerous objects and features obtained, when the following detailed description is considered in conjunction with the following drawings, in which:

FIG. 4 is a simplified illustration of a financed amount assistance system as implemented within a window of a user interface in accordance with an embodiment of the disclosure; and FIG. 5 is a simplified illustration of a financed amount assistance system as implemented within a window of a user interface in accordance with an embodiment of the disclosure for displaying price information related to recommended vehicle insurance coverage.

DETAILED DESCRIPTION

Figure 1:
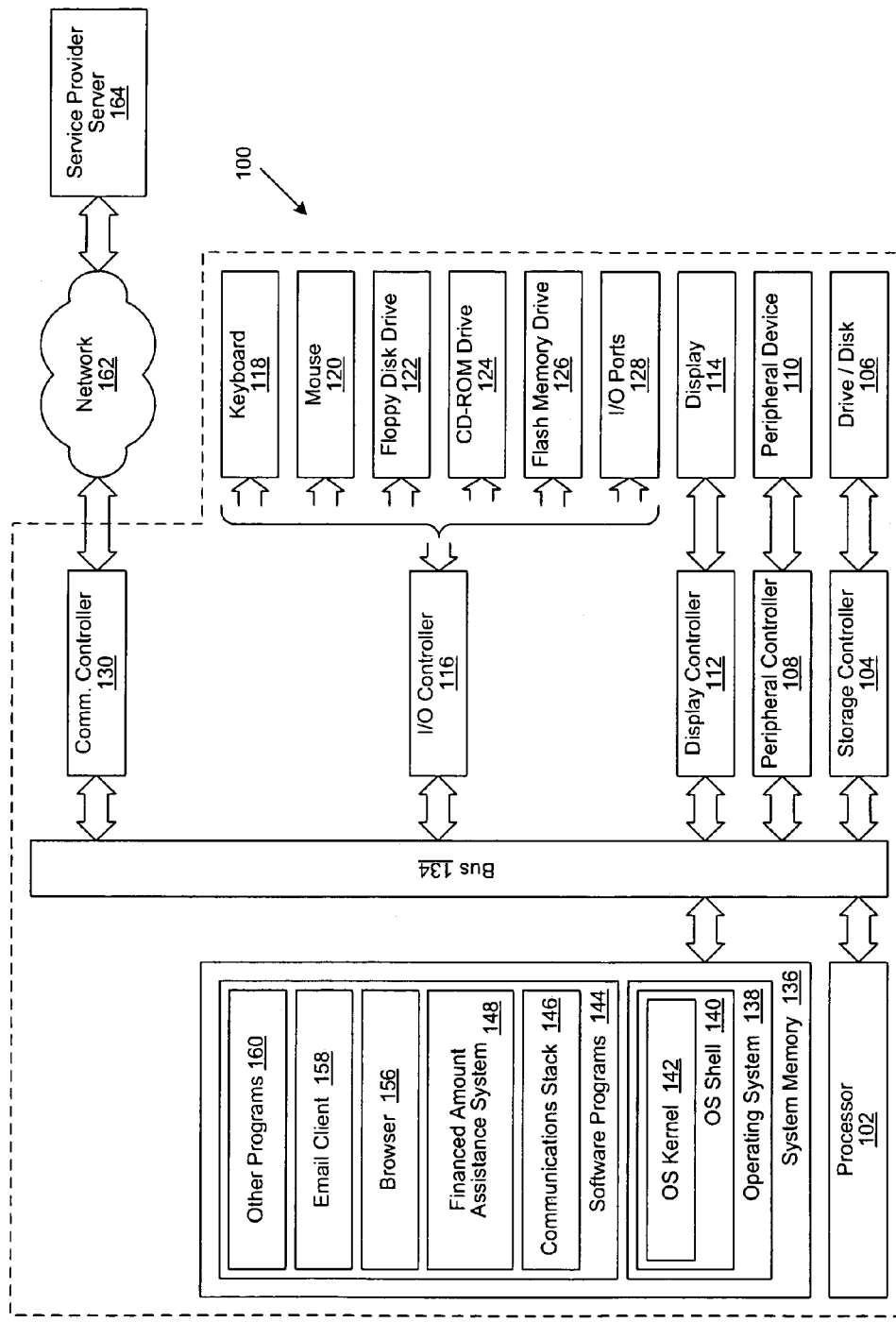
FIG. 1 depicts an exemplary client information processing system (IPS) in which embodiments of the disclosure may be implemented.

A method, system and computer-usable medium are disclosed for determining a maximum amount to finance based on a plurality of periodic payments. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110.

An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a financed amount assistance system 148. The financed amount assistance system 148 includes computer executable instructions for implementing the processes described in FIGS. 2-5 described hereinbelow. In one embodiment, client IPS 100 is able to download the computer executable instructions of the financed amount assistance system 148 from a service provider server 164 located at a remote location. In another embodiment, the computer executable instructions of the financed amount assistance system 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
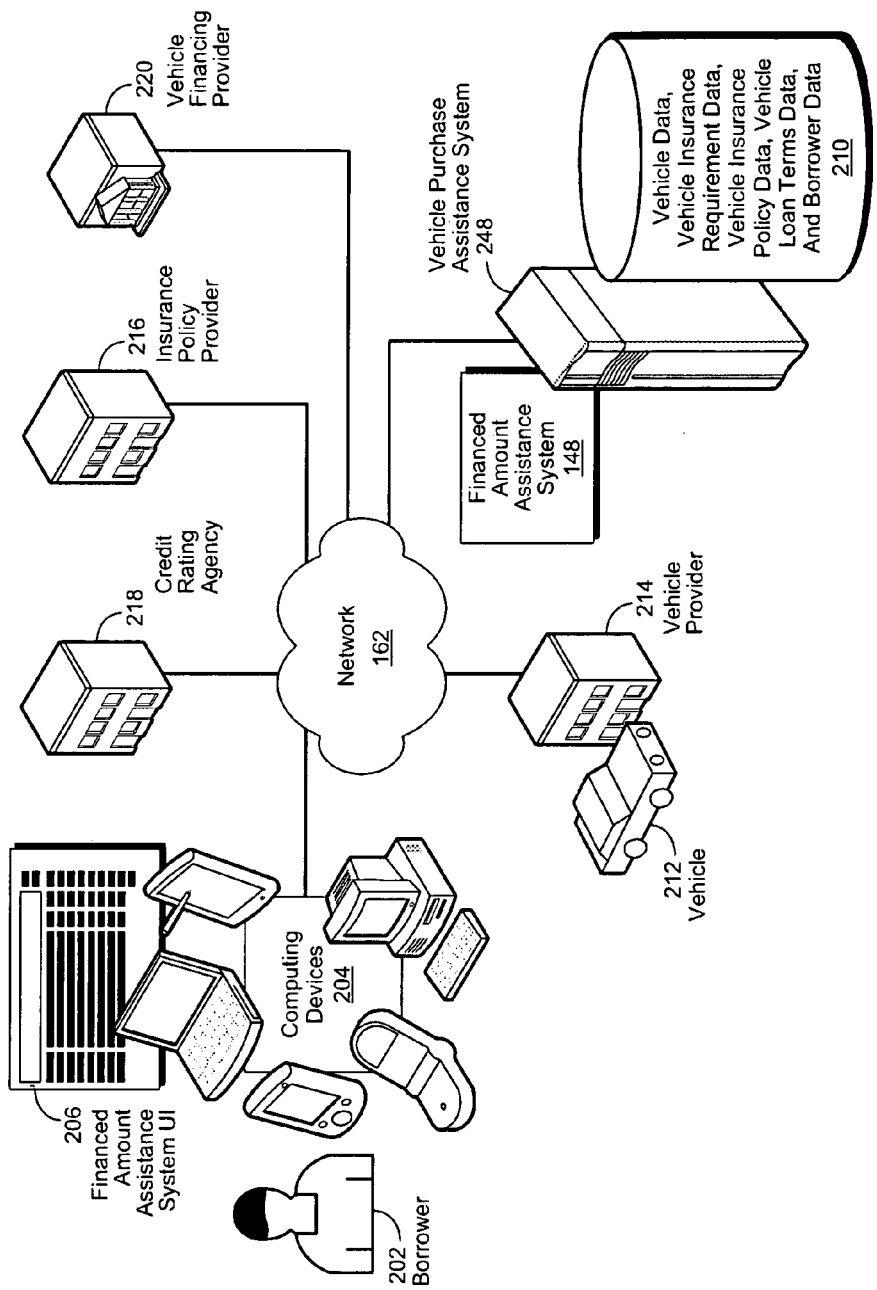
FIG. 2 is a simplified block diagram of a financed amount assistance system as implemented in accordance with an embodiment of the disclosure.

FIG. 2 is a simplified block diagram of a financed amount assistance system as implemented in accordance with an embodiment of the disclosure. In various embodiments, the maximum financed amount of the purchase price of a vehicle 212 is determined based on a plurality of periodic payments, including the cost of vehicle insurance coverage provided by an insurance policy provider 216. In these and other embodiments, a financed amount assistance system 148 is implemented with a vehicle purchase assistance system 248, which comprises a repository of vehicle data, vehicle insurance requirement data, vehicle insurance policy data, vehicle loan terms data, and borrower data 210.

In this embodiment, a borrower 202 uses a computing device 204 to establish an on-line session with the financed amount assistance system 148 over a connection to network 162. In various embodiments, a computing device 204 may comprise a personal computer, a laptop computer, or a tablet computer. The computing device 204 may also comprise a personal digital assistant (PDA), a mobile telephone, or any other suitable device operable to display the financed amount system user interface (UI) 206 and establish a connection with network 162. The borrower 202 provides authentication credentials and is authenticated, followed by the retrieval of data associated with the borrower. In various embodiments, the data associated with the borrower comprises the borrower's address and associated financial information, such as payment history information and a credit rating score provided by a credit rating agency 218. Likewise, the data associated with the borrower comprises the borrower's driving record data and associated vehicle insurance claim data.

The borrower likewise provides information related to a target vehicle 212 provided by a vehicle provider 214. In various embodiments, the provided vehicle information may comprise the vehicle's age, its list price or actual cost, its classification (e.g., sedan, truck, etc.), various description data (e.g., model), related crash rating data, or corresponding repair cost data. The borrower then provides a maximum periodic payment amount for the cost of financing the target vehicle 212 and insuring it.

Vehicle insurance requirement data, vehicle insurance policy data, and vehicle loan terms data is then provided for processing. In various embodiments, the vehicle insurance requirement data may comprise minimum insurance coverage requirements mandated by a state law or by a financial institution, such as a vehicle financing provider 220, holding a lien on a vehicle. In various embodiments, the vehicle insurance policy data may comprise vehicle insurance policy coverage, vehicle insurance policy coverage parameters, and corresponding premium amounts to the coverage parameters. In these and various other embodiments, the vehicle loan terms data may comprise the purchase amount of the vehicle 212, the amount of a down payment, or a financed amount. Likewise, the vehicle loan terms data may also comprise an annual percentage rate, a number of periodic payments, a periodic payment amount, or a credit rating score associated with the borrower 202.

The provided vehicle data, vehicle insurance requirement data, vehicle insurance policy data, and borrower data is processed to generate a periodic cost for a vehicle insurance policy. Thereafter, the provided vehicle data, vehicle loan terms data, and borrower data are processed to generate a periodic cost for a loan on the vehicle 212. In turn, the periodic cost for the vehicle insurance policy, the periodic cost for a loan on the vehicle, and the total periodic payment amount provided by the borrower 202 are processed to generate a maximum amount of the purchase price of the vehicle 212 to finance. In various embodiments, approaches known to skilled practitioners of the art are implemented to perform the processing operations. Many such approaches are known and are not intended to limit the spirit, scope, or intent of the present disclosure. The maximum vehicle purchase amount to finance is then displayed within the financed amount assistance system UI 206. If the borrower 202 is dissatisfied with the results, the provided information is modified within the financed amount assistance system UI 206 and resubmitted for processing.

Figure 3A:
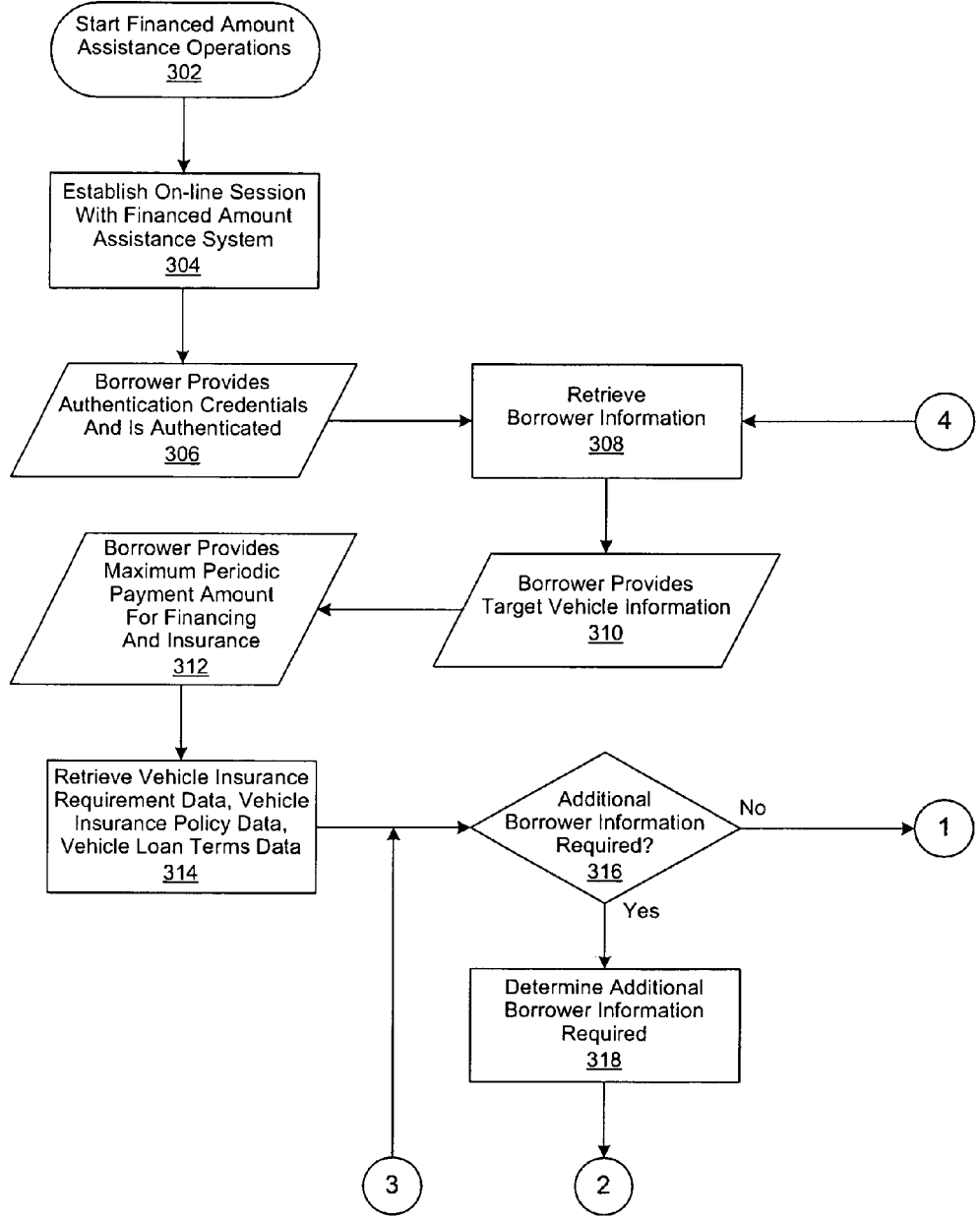
FIGS. 3a-b are a generalized flowchart of the operation of a financed amount assistance system as implemented in accordance with an embodiment of the disclosure.
Figure 3B:
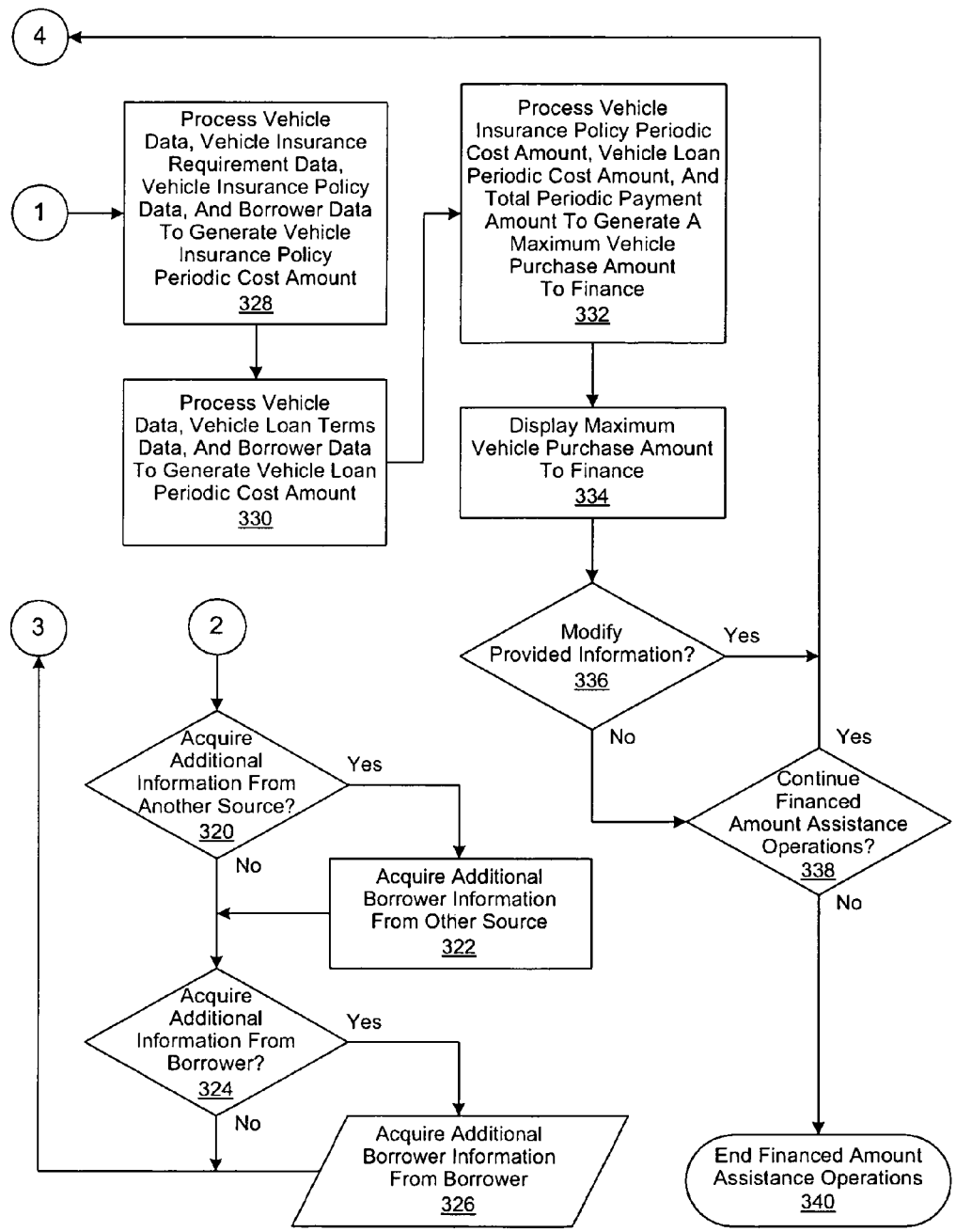

FIGS. 3*a*-*b* are a generalized flowchart of the operation of a financed amount assistance system as implemented in accordance with an embodiment of the disclosure. In various embodiments, the maximum financed amount of the purchase price of a vehicle is determined based on a plurality of periodic payments, including the cost of vehicle insurance coverage. In this embodiment, financed amount assistance operations are begun in block 302, followed by a prospective borrower establishing an on-line session with the financed amount assistance system in block 304. In block 306, the borrower provides authentication credentials and is authenticated, followed by the retrieval of data associated with the borrower in block 308. In various embodiments, the data associated with the borrower comprises the borrower's address and associated financial information, such as payment history information and a credit rating score provided by a credit rating agency. Likewise, the data associated with the borrower comprises the borrower's driving record data and associated vehicle insurance claim data.

In block 310, the borrower provides information related to a target vehicle. In various embodiments, the provided vehicle information may comprise the vehicle's age, its list price or actual cost, its classification (e.g., sedan, truck, etc.), various description data (e.g., model), related crash rating data, or corresponding repair cost data. As an example, the provided vehicle information may be generalized to simply include a four door sedan with a four cylinder engine costing less than $20,000. As another example, the provided vehicle information may be as specific as describing a Ford F150 XLT SuperCab truck with a 4.6L 3V V8 engine, 6-speed automatic transmission, and leather interior. It will be apparent that many such combinations of provided vehicle information are possible and the foregoing is not intended to limit the spirit, scope or intent of the disclosure.

The borrower then provides a maximum periodic payment amount in block 312 for the cost of financing the target vehicle and insuring it. In block 314, vehicle insurance requirement data, vehicle insurance policy data, and vehicle loan terms data is retrieved. In various embodiments, the vehicle insurance requirement data may comprise minimum insurance coverage requirements mandated by a state law or by a financial institution holding a lien on a vehicle. As an example, the State of Texas currently requires a vehicle be insured for a minimum of $25,000 of injury liability coverage, $50,000 coverage for all injuries, and $25,000 for property damage in an accident. Other states currently have similar requirements. Likewise, a financial institution may require collision coverage that is at least equal to the financed value of the vehicle. In various embodiments, the vehicle insurance policy data may comprise vehicle insurance policy coverage, vehicle insurance policy coverage parameters, and corresponding premium amounts to the coverage parameters. In these and various other embodiments, the vehicle loan terms data may comprise the purchase amount of the vehicle, the amount of a down payment, or a financed amount. Likewise, the vehicle loan terms data may also comprise an annual percentage rate, a number of periodic payments, a periodic payment amount, or a credit rating score associated with the borrower.

A determination is then made in block 316 whether additional borrower information is required. If so, then the additional borrower information is determined in block 318, followed by a determination in block 320 whether the additional information is to be acquired from another source. If so, then the additional borrower is acquired from the other source. As an example, it is now common practice for vehicle insurance rates to be based, in part, on a driver's credit rating. An insurance provider may wish to receive an updated credit rating score from a credit rating service before determining the cost of a vehicle insurance policy. If it is determined in block 320 to not acquire additional borrower information from another source, or if it is acquired from the other source in block 322, then a determination is made in block 324 whether to acquire additional borrower information from the borrower. If so, then the additional information is acquired from the borrower in block 326. For example, an insurance provider may wish to know how many miles the vehicle might be driven each year and whether the vehicle is intended for personal or commercial use. If it is determined in block 324 to not acquire additional borrower information from the borrower, or if it is acquired from the borrower in block 326, then the process is continued, proceeding to block 316.

However, if it is determined in block 316 that additional borrower information is not required, then the provided vehicle data, vehicle insurance requirement data, vehicle insurance policy data, and borrower data is processed to generate a periodic cost for a vehicle insurance policy. The provided vehicle data, vehicle loan terms data, and borrower data are then processed in block 330 to generate a periodic cost for a loan on the vehicle. In turn, the periodic cost for the vehicle insurance policy, the periodic cost for a loan on the vehicle, and the total periodic payment amount provided in block 312 are processed in block 332 to generate a maximum amount of the purchase price of the vehicle to finance. In various embodiments, approaches known to skilled practitioners of the art are implemented to perform the processing operations performed in blocks 328, 330, and 332. Many such approaches are known and are not intended to limit the spirit, scope, or intent of the present disclosure. The maximum vehicle purchase amount to finance is then displayed within a user interface in block 334, followed by a determination in block 336 whether to modify the provided information. If so, the process is continued, proceeding with block 308. Otherwise, a determination is made in block 338 whether to continue financed amount assistance operations. If so, then the process is continued, proceeding to block 308. Otherwise financed amount assistance operations are ended in block 340.

FIG. 4 is a simplified illustration of a financed amount assistance system as implemented within a window of a user interface in accordance with an embodiment of the disclosure. In this embodiment, a user interface (UI) 206 of a financed amount assistance system comprises a UI window 402. The UI window 402 further comprises data entry fields for the 'Borrower's Name' 404, the borrower's 'Residence State' 406, and the 'Borrower's Social Security Number (SSN)' 408. Likewise, the UI window 402 further comprises data entry fields for a 'Vehicle Classification' 410, a 'Vehicle Manufacturer' 412, a 'Vehicle Model' 414, a plurality of check boxes 418, 420 for indicating whether the vehicle is new or used, and a corresponding data entry field 422 for the vehicle year model. In addition, the UI window 402 comprises a data entry field for a 'Maximum Monthly Cost, command buttons 'Submit Vehicle Information' 436 and 'Re-submit Vehicle Information 438, and a 'Vehicle Insurance Advice' 414 window. Likewise, the UI window 404 further comprises a plurality of checkboxes 428, 430, 432, each respectively corresponding to a level of vehicle 'Insurance Coverage' 424. The UI window 402 further comprises display fields for a 'Maximum Loan Amount' 444, an 'Interest Rate' 446, a 'Loan Term' 448, and a 'Monthly Payment' 450, each corresponding to a 'Monthly Loan Cost' 440. The display window 'Monthly Payment' 450 likewise corresponds to a 'Monthly Insurance Cost' 442 and a 'Total Monthly Cost' 452.

As described in greater detail herein, but simplified for illustration purposes in FIG. 4, the borrower enters borrower information, such as their name, 'Charles Adams' into the 'Borrower's Name' 404 data entry field. Likewise, the borrower respectively enters the state they reside in, 'Texas' into the 'Residence State' 406 data entry field, and their SSN# '123-45-6789' into the 'Borrower's SSN#' 408 data entry fields. Next, the borrower enters the classification of a vehicle 'SUV' into the 'Vehicle Classification' 410 data field, the manufacture of the vehicle 'MA' into the 'Vehicle Manufacturer' 412 data entry field, and the vehicle model 'Sorento' into the 'Vehicle Model' 414 data entry field. The borrower then selects checkbox 418 to indicate that the vehicle is 'New' and enters the year model '2009' into the 'Year Model' 422 data entry field. Next, the borrower selects checkbox 428 to indicate that they only wish to carry minimum 'Insurance Coverage' 424, followed by entering '$450.00' into the 'Maximum Monthly Cost' 434 data entry field to indicate the maximum monthly cost they are willing to incur. The entered information is then submitted to the financed amount assistance system through a user gesture such as the user using a mouse-click with cursor 460 on the 'Submit Vehicle Information' command button 436.

The submitted information is processed as described in greater detail herein. As a result of the processing a maximum loan amount of '$20,000.00' is displayed in the 'Maximum Loan Amount' 444 display field, along with a corresponding interest rate of '8%' displayed in the 'Interest Rate' 446 display field. Likewise, a corresponding loan term of '72 months' is displayed in the 'Loan Term' 448 display field, with a likewise corresponding 'Monthly Loan Cost' 440 of '$350.66' displayed in the 'Monthly Payment' 450 data entry field. As likewise displayed, a 'Monthly Insurance Cost' 442 of '$75.58' is displayed in the corresponding 'Monthly Payment' 450 field. Likewise, a total monthly cost 452 of '$426.24' is displayed in its corresponding 'Monthly Payment' 450 field. It will be appreciated that the total monthly cost 452 of '$426.24' displayed in the 'Monthly Payment' 450 data entry field is less than the amount of '$450.00' entered by the borrower into the 'Maximum Monthly Cost' 434 data entry field. As illustrated in FIG. 4, the borrower is also advised in the 'Vehicle Insurance Advice' 414 window that while the monthly insurance cost 442 is based on the 'Minimum' vehicle insurance coverage 424 selected by checking checkbox 428. The 'Vehicle Insurance Advice' 414 window also advises the borrower that they can select 'Average' vehicle insurance coverage while still retaining a total monthly cost 452 that is less than the total monthly cost 452 of '$426.24' displayed in the 'Monthly Payment' 450 data entry field.

FIG. 5 is a simplified illustration of a financed amount assistance system as implemented within a window of a user interface in accordance with an embodiment of the disclosure for displaying price information related to recommended vehicle insurance coverage. Referring now to FIG. 5, the borrower has elected to follow the advice offered within the 'Vehicle Insurance Advice' 414 window in FIG. 4. Accordingly, the borrower has checked checkbox 530 to select 'Average' vehicle insurance coverage and has resubmitted the entered information through a user gesture such as a mouse-click with cursor 460 on the 'Re-submit Vehicle Information' command button 538. As a result, the 'Monthly Insurance Cost' 542 is now displayed as '$98.77' in its corresponding 'Monthly Payment' 450 data display field and the 'Total Monthly Cost' 552 is now displayed as '$449.43' within its corresponding 'Monthly Payment' 450 data display field. It will be likewise be appreciated that the total monthly cost 552 of '$449.43' displayed in the 'Monthly Payment' 450 data entry field is still less than the amount of '$450.00' entered by the borrower into the 'Maximum Monthly Cost' 434 data entry field. Likewise, the borrower receives an advisory message within the 'Vehicle Insurance Advice' 514 window that they have elected to select 'Average' vehicle insurance coverage, which surpasses the minimum requirements for the state of Texas. Furthermore, they are advised that despite electing to select higher coverage, their total monthly cost is still less than their 'Maximum Monthly Cost' 434 of '$450.00.'

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed:

1. A system for managing periodic payments, comprising:
a repository of vehicle data, vehicle insurance requirement data, vehicle insurance policy data, vehicle loan terms data, and borrower data; and
computer-executable non-transitory processing logic operable to:
receive user input data from a user comprising a maximum total periodic payment amount that a user is willing to incur;
process said vehicle data, said vehicle insurance requirement data, said vehicle insurance policy data, and said borrower data to generate vehicle insurance policy periodic cost data;
wherein said vehicle insurance requirement data comprises minimum insurance coverage requirements for a vehicle and includes other levels of insurance, said minimum insurance coverage requirements mandated by a state law and a financial institution holding a lien on said vehicle;
process said vehicle data, said vehicle loan terms data, and said borrower data to generate vehicle loan periodic cost data;
process said vehicle insurance policy periodic cost data, said vehicle loan periodic cost data, and said total periodic payment amount to generate a maximum vehicle purchase amount to finance;
display a first total periodic cost for said vehicle loan periodic cost data and said first vehicle insurance policy periodic costs data collectively; and
process, in response to said first total periodic cost being less than said maximum total periodic payment amount, said vehicle data, said vehicle insurance requirement data, said vehicle insurance policy data, and said borrower data to generate second vehicle insurance policy periodic cost data for said particular vehicle;
wherein said second vehicle insurance policy periodic cost data for said particular vehicle is based on one of said other levels of insurance;
display an advisory suggesting the one of said other levels of insurance and that a second total periodic cost for said vehicle loan periodic cost data and said second vehicle insurance policy periodic costs data collectively is less than said maximum total periodic payment amount in response to said second total periodic cost being less than said maximum total periodic payment amount.

2. The system of claim 1, wherein said vehicle insurance policy data comprises vehicle insurance policy coverage, vehicle insurance policy coverage parameters, and premium amounts corresponding to said parameters.

3. The system of claim 1, wherein said vehicle data comprises at least one of vehicle age data, vehicle cost data, vehicle classification data, vehicle description data, vehicle crash rating data, or vehicle repair cost data.

4. The system of claim 1, wherein said vehicle loan terms data comprises at least one of a vehicle purchase amount, a vehicle purchase amount reduction payment, a financed amount, an annual percentage rate, a number of periodic payments, a periodic payment amount, or a credit rating score associated with said borrower.

5. The system of claim 1, wherein said borrower data comprises at least one of borrower address, borrower financial data, borrower driving record data, or borrower vehicle insurance claim data.

6. A system for managing period payments, comprising:
a computing device having a user interface operable to receive user input data from a user comprising vehicle data, borrower data, and a maximum total periodic payment amount that a user is willing to incur; and
computer-executable non-transitory processing logic operable to:
receive vehicle insurance requirement data, vehicle insurance policy data, and vehicle loan terms data;
process said vehicle data, said vehicle insurance requirement data, said vehicle insurance policy data, and said borrower data to generate first vehicle insurance policy periodic cost data for said particular vehicle;
wherein said vehicle insurance requirement data includes minimum insurance coverage requirements for a vehicle and includes other levels of insurance, said minimum insurance coverage requirements mandated by a state law and a financial institution holding a lien on said vehicle;
wherein said first vehicle insurance policy periodic cost data for said particular vehicle is based on said minimum insurance coverage requirements;
process said vehicle data, said vehicle loan terms data, and said borrower data to generate vehicle loan periodic cost data for said particular vehicle;
process said first vehicle insurance policy periodic cost data, said vehicle loan periodic cost data, and said total periodic payment amount to generate a maximum vehicle purchase amount to finance for said particular vehicle;
display said maximum vehicle purchase amount within said user interface;
display a first total periodic cost for said vehicle loan periodic cost data and said first vehicle insurance policy periodic costs data collectively; and
process, in response to said first total periodic cost being less than said maximum total periodic payment amount, said vehicle data, said vehicle insurance requirement data, said vehicle insurance policy data, and said borrower data to generate second vehicle insurance policy periodic cost data for said particular vehicle;
wherein said second vehicle insurance policy periodic cost data for said particular vehicle is based on one of said other levels of insurance;
display an advisory suggesting the one of said other levels of insurance and that a second total periodic cost for said vehicle loan periodic cost data and said second vehicle insurance policy periodic costs data collectively is less than said maximum total periodic payment amount in response to said second total periodic cost being less than said maximum total periodic payment amount.

7. The system of claim 6 wherein said vehicle insurance policy data comprises vehicle insurance policy coverage, vehicle insurance policy coverage parameters, and premium amounts corresponding to said parameters.

8. The system of claim 6, wherein said vehicle data comprises at least one of vehicle age data, vehicle cost data, vehicle classification data, vehicle description data, vehicle crash rating data, or vehicle repair cost data.

9. The system of claim 6, wherein said vehicle loan terms data comprises at least one of a vehicle purchase amount, a vehicle purchase amount reduction payment, a financed amount, an annual percentage rate, a number of periodic payments, a periodic payment amount, or a credit rating score associated with said borrower.

10. The system of claim 6, wherein said borrower data comprises at least one of borrower address, borrower financial data, borrower driving record data, or borrower vehicle insurance claim data.

* * * * *